(No Model.)

F. W. BRANN.
CONDUIT ELECTRIC RAILWAY.

No. 492,265. Patented Feb. 21, 1893.

Witnesses,

Inventor,
Fred W. Brann
By Dewey & Co.
Attys.

UNITED STATES PATENT OFFICE.

FRED W. BRANN, OF OAKLAND, CALIFORNIA.

CONDUIT ELECTRIC RAILWAY.

SPECIFICATION forming part of Letters Patent No. 492,265, dated February 21, 1893.

Application filed May 16, 1892. Serial No. 433,215. (No model.)

*To all whom it may concern:*

Be it known that I, FRED W. BRANN, a citizen of the United States, residing at Oakland, Alameda county, State of California, have invented an Improvement in Underground Electric Railways; and I hereby declare the following to be a full, clear, and exact description of the same.

My invention relates to certain improvements in underground electric railways, conduits, conductors, and attachments, and it consists in certain details of construction which will be more fully explained by reference to the accompanying drawings, in which—

Figure 1:
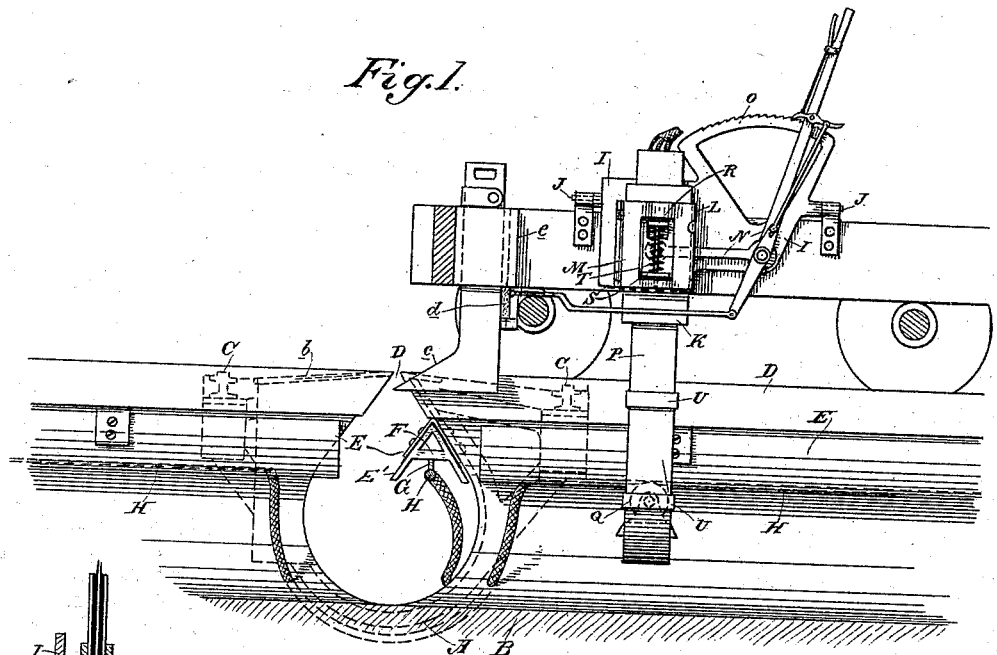
Figure 4:
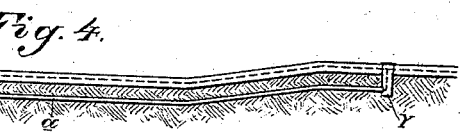
Figure 2:
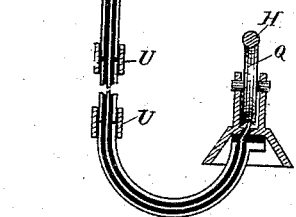
Figure 3:
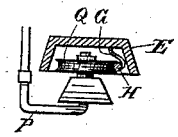

Figure 1 is a longitudinal, vertical cross section through the tube. Fig. 2 is a cross section through the trolley shank. Fig. 3 shows a horizontal trolley wheel. Fig. 4 shows the arrangement of using side wires.

The object of my present invention is to provide for a more perfect protection and insulation of the conductor which carries the electric current within the underground conduit, a means for producing a thoroughly insulated connection between the trolley which travels in contact with the conductor, and the rheostat and intermediate connections with the motor, with means for preventing the grounding or short-circuiting of the current, and mechanical contrivances whereby a more perfect operation of the apparatus is insured.

In the present case I have shown my invention as applied to an underground railway, the conduit of which is composed of metal yokes A set in concrete B and supporting the rails C upon which the cars travel. Within this conduit, and at one side of the slot D, through which communication is made between the car and the conduit, I fix a protecting and insulating roof E which is preferably made of wood saturated with creosote or other protective material put together in the form of the letter A. This roof-shaped device is secured continuously along the inner braces of the yokes A of the conduit, by bolts hangers or otherwise, and has within it a second piece of wood E' made to fit into the apex of the channel beneath, being also separated from it by insulating plates of any suitable material. From the interior strip F of the second piece E' depend at intervals the hangers G, and to these hangers the conducting wire H is attached.

At points where two lines cross each other, the tracks and the slot irons are cut in the usual manner for cable and other railways having underground conduits, and the protecting roofs are also cut so as to allow the trolley shanks of either road to cross the other without obstruction or interference. At such points the conducting wires temporarily leave the protecting roof and are carried down through insulated tubes beneath the bottom of the conduit until the space is crossed, and thence up again into position. The momentum of the cars arriving at such points can be depended upon to carry the car across the short space thus left without conducting wire.

The car is represented in the present case by a frame supported by two pairs of wheels and adapted to carry all the necessary appurtenances of an electric car, which not being new, I have not here especially shown.

The trolley shank is supported from a rack frame I having journal pins at J in the line of travel of the car, so that this frame may oscillate about the journals from side to side, and thus compensate for the vibration of the car upon the track, and relieve the trolley and the conductor from the strain of such vibrations.

K is a rectangular sleeve of considerable length, inclosing the trolley shank, and which fits into a vertical box L upon the hinged frame I, in which it slides up and down. When placed in this box it is secured and prevented from coming out by a door M which closes and keeps it in place. When it is desired to remove the device it is done by opening this door.

N is a bell crank lever, the short arm of which engages a pin or stud upon the side of the sleeve K, and the long arm extends upward, and has a pawl engaging the curved rack bar O. By this means the sleeve is raised or depressed at will. Through this sleeve passes the trolley shank P, being curved at the bottom so as to pass around beneath the lower inner edge of the protecting roof of the conductor E, and it carries a properly insulated trolley wheel Q, which, when the apparatus is in operation, travels in contact with the conducting wire. A hole is made in one side of the sleeve K, and through this projects a stud R from the vertically movably trolley shank. A pin passes through this stud and through a stationary stud S upon the lower edge of the slotted opening in the side of the sleeve, and the pin is surrounded by a spring T which lies between the two studs. This spring gives a certain elasticity to the trolley shank, and allows it to constantly move up and down, and thus compensate for irregular pressure or other irregularities in the line, so that the connection between the trolley wheel and the conducting wire will always be properly maintained without exerting too heavy a pressure.

The trolley shank is made of a hollow rectangular bar having insulating material in the interior through or between which the conducting wires which lead from the trolley wheel to the mechanism on the car pass. In addition to the insulating material surrounding the conducting wires I have also provided for unforeseen accidents which might make a temporary short circuit, by making this trolley shank in sections, the ends of each section being secured in and insulated from exterior couplings U. As each of these sections terminates within one of the couplings surrounded by insulating material, and at some distance from the opposing end of the next section, it will be manifest that if anything goes wrong which would be liable to short-circuit the current under ordinary conditions, this insulation will assist in protecting it from such accident. The wires are brought out upon the upper face of the curved lower portion of the trolley shank, and are protected by suitable insulating material which is placed upon this surface and through which the wires pass. To this surface is bolted a rectangular petticoat insulated therefrom and having journal standards within which the journals of the trolley wheel V revolve. The conducting wires are so placed as to connect with these shafts, and thus convey the current from the main conducting wire through the trolley shank to the mechanism on the car.

By means of the bell crank lever N previously described and situated upon the car, it will be seen that the trolley shank and the trolley may be dropped out of contact with the conductor, and brought up into contact with it whenever it may be desirable to do so.

In some cases it may be preferable to use a vertically disposed trolley, as shown in Figs. 1 and 2, but in other cases I have found it preferable to place the conducting wire near one side of the interior of the protecting roof, and to allow the trolley wheel to run horizontally or upon a vertical axis, but the details of the connections will be essentially the same.

At points where there is danger of flooding the conduit or interrupting the traffic, I have shown what are termed cut out boxes Y upon each side of the sunken or depressed section of track where the danger is liable to occur, and in these boxes are what are known as fuses which burn out, or switches which act when the current is thus short-circuited, thus throwing the current from the main line wire into an independent side wire which passes through hermetically sealed tubes $a$ arranged parallel with the track, and adapted to protect this side conductor from all moisture so that the current will be carried through this wire, and again returned into the main line wire after the flood district is passed. At such points the car will either have to move across by gravitation or be moved by other means, but as such accident usually only incapacitates a very short portion of the road, it will be seen that by this supplemental conductor I am enabled to keep the whole line in good running condition, It will be manifest that instead of running this supplemental wire in an underground tube, it may be carried on posts above and over the district, and if such district is of considerable extent, it will be feasible to employ overhead connections between the car and the conducting wire while passing such district. The same arrangement of overhead wires may be also employed where the line of road is partially within a city where overhead wires are prohibited, and partially in the country where such wires may be employed. In such case, the underground wires would be used within the limits of the city, but as soon as these limits were passed the wire would be brought out from the underground tunnel and carried upon posts so as to make an overhead system if found desirable.

In case of obstruction by reason of collection of water where sewers are small or choked, it is feasible to provide reservoirs of considerable size into which a certain amount of water can be allowed to run and from which it could be conveyed by independent pipes.

When it is desired for any purpose to remove the trolley and trolley shank from the car and from the conduit, it is done by the aid of trap doors $b$ fitted into the street surface and connecting through the slot iron upon one side so that when the trap is raised, an open space of sufficient size is provided to allow the trolley and shank to be easily lifted out. By unlatching the door M in a vertical guide frame through which the trolley shank slides upon the car and uncoupling the conducting wires from the upper end of the shank, the latter can be removed with very little trouble and as easily replaced.

Considerable difficulty is experienced by obstructions which become wedged in the slot in the track and which cause trouble when the car approaches so as to allow the shank to strike them. In order to overcome this difficulty and lift such obstructions from the slot I have shown a beveled or inclined wedge-shaped plate $c$ which is supported from a strong shank backed by springs or rubbers $d$, which shank moves up and down in a vertical guide $e$ and is connected with any well known means such as a lever (not shown) on the car for raising and depressing it so as to allow the share to travel in the slot, and thus lift anything out which may become wedged therein, or when not needed may be raised clear of the track. In case the obstacle is strongly embedded, the wedge will compress the springs or rubber backing contacting with releasing device of the lever pawl, and allowing the lever to fly back. In a cable railway, this would let go the grip.

Having thus described my invention, what I claim as new, and desire to secure by Letters Patent, is—

1. In an underground electric railway, the combination of the underground conduit having the slot on top through which communication is made between the car and the conductor within the conduit, an A-shaped roof made of non-conducting material and secured to the conduit frames at one side, and out of line with the slot, and a second interior non-conducting strip secured thereto with intervening non-conducting plates, hangers projecting from the interior strip having a conducting wire attached thereto beneath the overhanging edges of the projecting channel, substantially as herein described.

2. In an electric railway, the combination of the underground conduit slotted at the top, the A-shaped insulated roof secured to one side of the conduit out of the vertical plane of the slot, a second insulating strip secured within the first and separated therefrom by insulating plates, a conductor extending beneath the overhanging sides of the protecting roof having hangers by which it is supported secured to the inner non-conducting strip, a trolley-carrying shank attached to the car extending down through the slot into the conduit having the lower end curved upon itself, a conducting wire passing through the interior of said shank and insulated therefrom, an insulated trolley wheel mounted upon the lower up-turned end of the shank and adapted to travel in contact with the conducting wire, said trolley wheel being connected with the conductor which passes through the trolley shank, substantially as herein described.

3. A trolley shank consisting of hollow sections the ends of which are fitted into connecting couplings insulated and out of contact with each other, a conducting wire passing through said hollow sections and independently insulated therefrom, a trolley wheel mounted upon the up-turned lower end of the trolley shank by means of a supporting petticoat which is insulated from the shank, and insulated passages through which the shank wire passes to connect with the trolley wheel and remain out of contact with the shank, substantially as herein described.

4. In an electric railway, the combination of the underground slotted conduit, the insulated protecting roof within which the main conducting wire is supported, a sectional trolley shank carrying the insulated contact-wheel upon its up-turned lower end, an insulated conducting wire passing through the interior of the trolley shank to the mechanism upon the car, a case or guide through which the trolley shank passes having elastic connection whereby the shank is allowed a vertical movement to accommodate itself to movements of the car, and a guide upon the car within which the whole device is raised or depressed, substantially as herein described.

5. In an electric railway, the combination of the underground slotted conduit tube with the insulated and protected conducting wire, the hollow insulated trolley shank carrying the contact wheel upon its up-turned lower end with insulation therefrom, a conducting wire extending through said shank connecting with the trolley wheel and the mechanism upon the car and insulated from the shank, a rocking frame pivoted upon the car having a guide channel within which the trolley shank moves vertically, a lever connected with the trolley shank adapted to raise or depress it to make or break contact with the conducting wire, the oscillations of the supporting frame compensating for the vibrations of the car and relieving the trolley shank and trolley, substantially as herein described.

6. In an electric railway, the combination of the underground slotted conduit having the insulated protecting roof and the insulated conducting wire supported beneath its overhanging sides, a hollow trolley shank carrying a trolley wheel upon its upturned lower end to form a contact with the conducting wire, an insulated conducting wire within the trolley shank connecting the wheel with the mechanism upon the car, the vertical guide within which the trolley shank has vertical motion, a removable door or side to allow the trolley shank to be disengaged therefrom, and corresponding removable plates at intervals in the track whereby the trolley and its shank may be removed bodily from the conduit, substantially as herein described.

7. In an electric railway, the combination of the underground slotted conduit with the protected conducting wire, the trolley shank adjustably mounted upon the car extending down through the slot into the conduit having a trolley wheel supported upon its upturned lower end to form contact with the conducting wire within the conduit, and the means for clearing the slot in front of the trolley shank, consisting of the vertically movable wedge-shaped strip supported from the car independently of the trolley shank and adapted to enter the slot in front of the trolley shank when the car is moved, substantially as herein described.

In witness whereof I have hereunto set my hand.

FRED W. BRANN.

Witnesses:
GEORGE H. STRONG,
S. H. NOURSE.